June 5, 1962

F. A. LUNZER 3,038,083

ADJUSTABLE LIGHT BAFFLE

Filed Dec. 18, 1959

INVENTOR.
FREDERIC A. LUNZER

BY
James and Franklin
ATTORNEYS

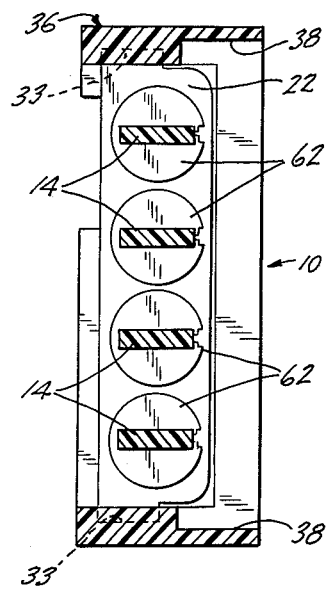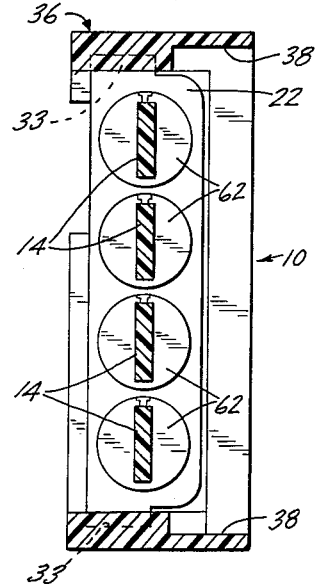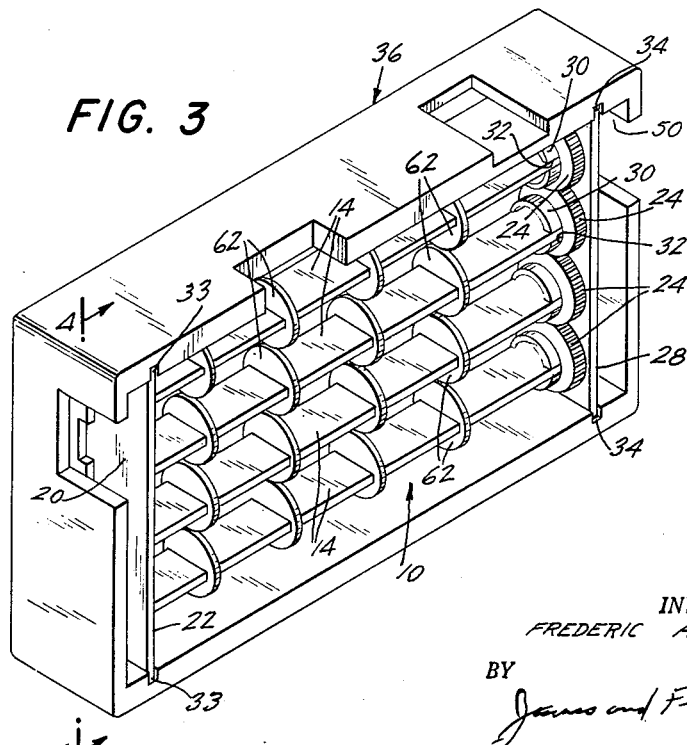

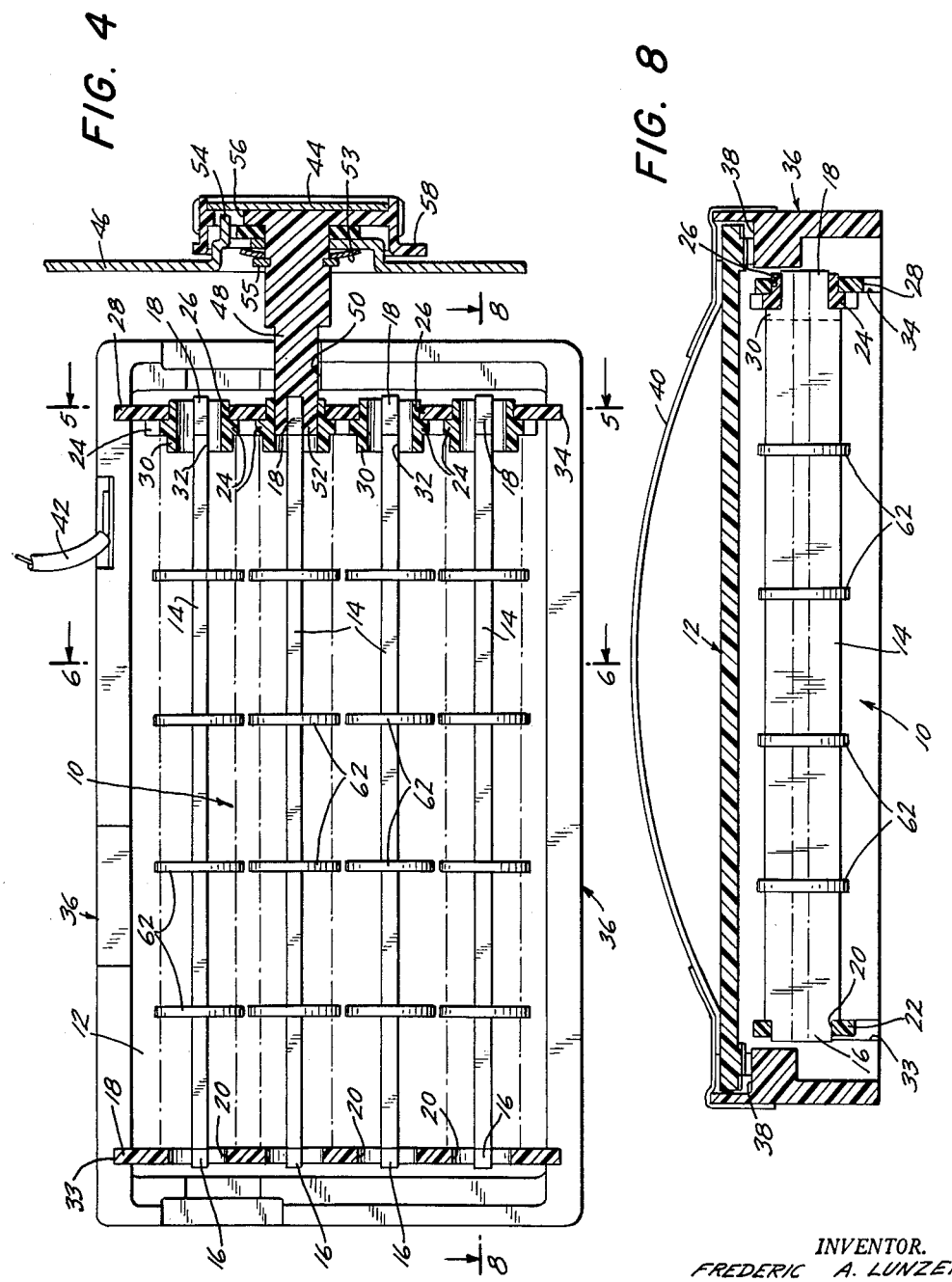

United States Patent Office 3,038,083
Patented June 5, 1962

3,038,083
ADJUSTABLE LIGHT BAFFLE
Frederic A. Lunzer, New York, N.Y., assignor to Dejur-Amsco Corporation, Long Island City, N.Y., a corporation of New York
Filed Dec. 18, 1959, Ser. No. 860,527
17 Claims. (Cl. 250—237)

The present invention relates to an adjustable baffle structure particularly adapted to be used in conjunction with a photoelectric cell and to control the amount of light reaching said cell.

There are many occasions when it is desired to modify the operation of light sensitive elements such as photoelectric cells by controllably varying the amount of light which reaches those elements. One particular instance, in connection with which the instant invention is here specifically disclosed, is the use of a camera provided with a light-sensitive exposure meter which will automatically (or semi-automatically) vary the lens opening (or shutter speed) in accordance with the amount of light which reaches the camera, thereby ensuring proper film exposure. Some means must be provided for modifying the action of this light sensitive mechanism in order to take into account the speed or sensitivity of the particular film being employed at a given time. The more sensitive the film, the smaller should be the camera exposure for a given amount of external light. One way of accomplishing this modification is to vary the proportion of the external light which reaches the photoelectric cell to correspond to the sensitivity of the film being employed. The more sensitive the film, the greater should be the proportion of external light which reaches the photoelectric element, that element, in response to the greater amount of light reaching it, causing the exposure to be correspondingly reduced.

In a generalized sense the arrangement just described is an automatic exposure meter in which the sensitivity of the meter is manually modified to correspond to the sensitivity of the film being employed, that modification being effected by varying the proportion of the external light which reaches the light sensitive element. The problems inherent in proper exposure meter design are therefore applicable to this special types of meter. Two of these problems merit special comment.

From a practical point of view the light sensitive elements employed in meters of this type have surfaces adapted to be exposed to the light to be measured, which surfaces are not uniform insofar as their response to that light is concerned. One point or small area of the surface may be highly responsive to light while an adjacent point or area may be light-responsive to a much smaller degree. The overall action of an element of this type is, roughly speaking, the average of the light-responsiveness of each of the points on its surface which are subjected to the light to be measured. Accordingly it is important that as high a proportion as possible of the total light-sensitive area of the photoelectric element be utilized at any given time, particularly when comparatively small amounts of illumination are involved. The smaller the proportion of the overall light-sensitive area which is effectively utilized, the larger, and hence the more expensive, must be the photoelectric cell if a desired degree of sensitivity is to be obtained. The smaller the proportion of the overall light-sensitive area which is utilized at any given time, the greater the probability of inaccuracy arising from the non-uniform responsiveness to light of the individual areas of that light sensitive surface.

In the second place, these automatic exposure meters should, like all exposure meters, be adequately baffled in order to limit the angle at which ambient light can enter the device and still affect the photoelectric cell, thus restricting the angle of light acceptance of the photoelectric cell to something approximating the corresponding angle of light acceptance of the camera lens.

In accordance with the present invention an inexpensive and readily manufactured structure is disclosed which functions both as a baffle and as a means for varying the amount of light which can pass therethrough and reach a photoelectric cell which is positioned adjacent thereto. The baffle and light-varying structures are so integrated physically and functionally that the desired baffle effect is effectively maintained over substantially the entire range of light-admission adjustment, substantially the entire surface of the light-sensitive element is exposed to light at least over a portion of the range of light-admission adjustment, and the use of a single structure for producing both light-admission adjustment and baffling results in an appreciable saving in cost.

To accomplish these results the adjustable baffle of the present invention is composed of a plurality of articulately mounted strips having greater height than thickness, those strips being movable between first and second positions in which their thickness and their heights are respectively disposed essentially parallel to the face of an adjacent photoelectric element. In the first position a maximum of light passes between the strips and reaches the photoelectric element and, because the strips are relatively thin, substantially all of the area of the photoelectric element is exposed to that light. In the second position the strips obstruct a substantial portion of the external light, so that only a small proportion of that light can reach the photoelectric element. It is preferred that in the second position the strips be in line with one another with their adjacent edges spaced from one another by a short distance.

The strips themselves serve to baffle the light in one direction (here the strips are specifically shown as horizontally mounted, thereby producing a baffling effect in the vertical direction) over at least a substantial portion of their range of operative movement. These strips preferably carry a plurality of registering projecting parts, here specifically shown as of disk shape, which provide for baffling in the other direction (horizontal when the strips are horizontally mounted) no matter what the adjusted position of the strips may be.

To the accomplishment of the above, and to such other objects as may hereinafter appear, the present invention relates to the construction of an adjustable baffle, and to such a baffle in combination with a photoelectric cell such as is used as an automatic or semi-automatic exposure meter, as defined in the appended claims and as described in this specification, taken together with the accompanying drawings, in which:

FIG. 3 is a three-quarter perspective view of the adjustable baffle structure per se mounted within its supporting structure;

FIG. 4 is a cross sectional view taken along the line 4—4 of FIG. 3 and showing the photoelectric element secured in place and the manner in which the control knob is attached thereto;

FIG. 6 is a cross sectional view taken along the line 6—6 of FIG. 4;

FIG. 7 is a view similar to FIG. 6 but showing the strips rotated ninety degrees relative to their positions in FIG. 6; and FIG. 8 is a cross sectional view taken along the line 8—8 of FIG. 4.

Figure 1:
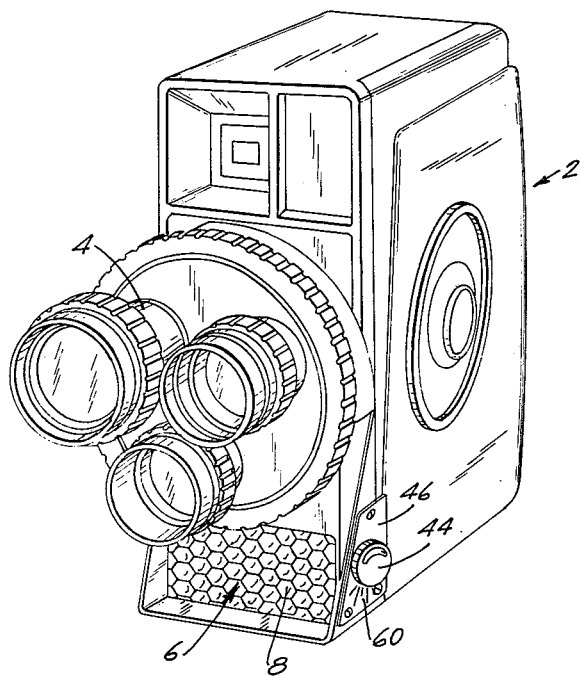
FIG. 1 is a three-quarter front perspective view of a motion picture camera having embodied therein the structure of the present invention.
Figure 5:
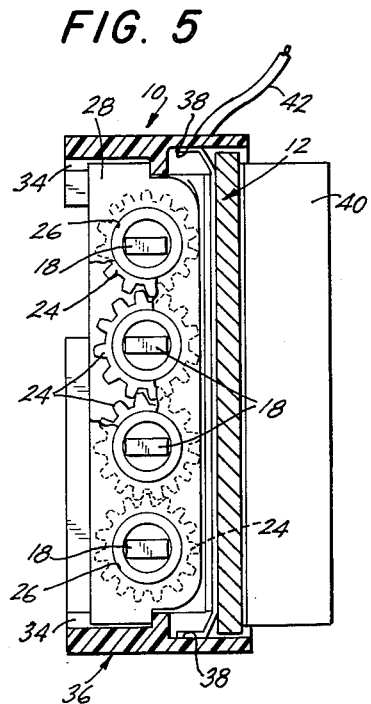
FIG. 5 is a cross sectional view taken along the line 5—5 of FIG. 4.

The invention is here specifically disclosed in connection with a camera generally designated 2 having a photographic lens 4 facing forwardly therefrom and an exposure meter assembly generally designated 6 in position thereon, that assembly comprising an external lenticular light-transmissive member 8 of essentially conventional design, an adjustable baffle structure generally designated 10, and a light-sensitive element generally designated 12. The lenticular light-transmissive element 8 may be mounted on the front face of the camera casing in any conventional manner. The adjustable baffle structure 10 and the light-sensitive element 12 are adapted to comprise a single unitary assembly.

The adjustable baffle 10 comprises a plurality of strips 14 each having a height appreciably greater than its thickness. For example, in a specific embodiment which has been constructed the strips have a height of approximately 5/32 inch and a thickness of approximately 1/32 inch. The ends 16 and 18 of these elongated strips 14 are reduced in height, the ends 16 being rotatably journaled in apertures 20 formed in mounting strip 22 and the ends 18 being press fitted into hollow gears 24 which are in turn rotatively journaled in apertures 26 formed in mounting strip 28. The apertures 20 and 26 register with one another and the axes of each set of these apertures are spaced from the axes of adjacent aperture sets by a distance slightly greater than the heights of the strips 14, the gears 24 for each of the strips 14 being in mesh with adjacent gears 24. In order to ensure that the gears 24 will rotate with the strips 14 to which they are connected, those gears are provided with flanges 30 provided with slots 32 into which the wide portions of the strips 14 adjacent their end portions 18 are received (see particularly FIG. 3). The mounting strips 22 and 28 are received in slots 33 and 34 respectively in an open rectangular ring frame generally designated 36. The strips 14 will be seen to extend across the open face of the frame 36 in what are essentially straight parallel lines. The gears 24 are meshed with one another so that all of the strips 14 will simultaneously assume the position shown in FIGS. 3, 4 and 6, in which they are disposed in parallel planes extending from the front to the rear of the ring frame 36.

The rear of the ring frame 36 is closed by the photoelectric element 12 which extends completely thereacross and is housed at its periphery in rearwardly opening recesses 38 in the ring frame 36, there being held in place by means of bracket 40. The spacing between the photoelectric cell 12 and the strips 14 is such as to permit free rotation of the latter. A lead 42 is electrically connected to and extends from the photoelectric cell 12.

The ring frame 36, together with the baffle assembly 10 and the photoelectric cell 12 carried thereby, is appropriately fixed within the casing of the camera 2 in any appropriate manner so as to be located immediately behind the lenticular light-transmissive element 8, with the baffle assembly 10 interposed between the lenticular element 8 and the photoelectric cell 12. Control knob 44 is rotatably mounted on dial plate 46 secured to the exterior of the camera casing, the control knob 44 including an inwardly projecting shaft-like part 48 which passes freely through a slot 50 formed in the adjacent side of the casing 36 and terminates in a bifurcated tip 52 which enters the hollow center of one of the gears 24 and grasps the exposed end 18 of the strip 14 therein received. Spring washer 53 is active against retaining ring 55 carried by the shaft 48 and frictionally holds knob 44 in any position to which it may be moved. The dial plate 46 has a projection 54 struck up therefrom and received within a slot 56 in the knob proper 44, thereby to limit the rotation of that knob to an arc of ninety degrees. When the knob 44 is rotated the strip 14 to which it is secured will be correspondingly rotated, and the other strips 14 will, via the gears 24, rotate also. The knob 44 may be provided with a pointer 58 adapted to cooperate with indicia 60 on the dial plate 46, which indicia may be calibrated in terms of film speed.

Each of the strips 14 is provided, along its length, with a plurality of disk-like radially projecting parts 62, the parts 62 on each strip 14 registering with and being comparatively closely spaced relative to the corresponding parts 62 on the adjacent strips 14. As may best be seen from FIGS. 6 and 7, the diameter of these disk-like parts 62 may be slightly greater than the height of the strips 14 and only slightly less than the spacing between the axes of rotation of the strips 14.

The strips 14 are, in FIGS. 3–6, shown in that operative position in which they admit the maximum amount of light to the photoelectric element 12. In this position they are disposed with their thicknesses essentially parallel to the face of the photoelectric cell 12. Light reaches the photoelectric element 12 by passing between the strips 14, and it is apparent from the drawings that the spaces are large between those strips 14 when they are in the position described. The combined thicknesses of the strips represent but a very small proportion of the total area of the photoelectric element 12 which is exposed to the light, and hence substantially the entire area thereof is subjected to light, thus making for maximum sensitivity and the least possibility of error. The angle at which light can enter the exposure meter and still reach and affect the photoelectric element 12 is controlled in part by the lenticular formation of the light-transmissive element 8. It is controlled in further part by the physical baffling effect of the strips 14 themselves insofar as the vertical angle of access is concerned, horizontal baffling being achieved by means of the disk-like projections 62 which, vertically aligned as they are, collectively constitute vertical baffle plates.

Figure 2:
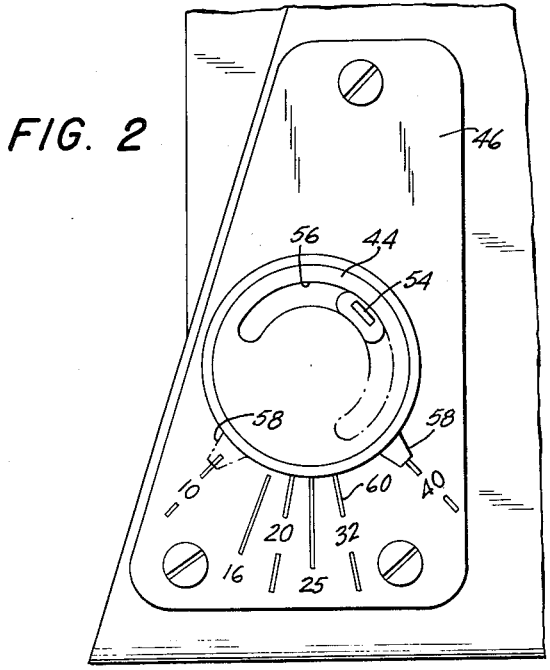
FIG. 2 is a detailed side elevational view, on an enlarged scale, showing the external manually accessible baffle control knob and side plate.

When it is desired to reduce the amount of light which reaches the photoelectric cell 12, this corresponding to reducing the sensitivity of the exposure meter per se, as should be done when a film of decreased speed or sensitivity is used, the knob 44 exposed on the outside of the camera casing is rotated in a counterclockwise direction as viewed in FIG. 2, thus correspondingly rotating the strip 14 to which it is directly connected, that strip being the second from the top as viewed in FIG. 4. The gears 24 which interconnect the various strips 14 will cause the first and third strips 14 from the top to rotate in the opposite direction and will cause the lowermost strip 14 to rotate in the same direction as the strip 14 which is directly connected to the knob 44. The maximum degree to which this rotation is permitted involves a ninety degree rotation of the strips 14 and of the knob 44. The strips 14, after that ninety degree rotation has been accomplished, assume the position shown in FIG. 7. They are, it will be observed, aligned with one another and with their heights essentially parallel to the light sensitive face of the photoelectric element 12. Light can reach the element 12 only through the narrow spaces between the opposing longitudinal edges of the strips 14.

The position of the strips 14 shown in FIG. 7 represents an extreme position, and the strips can be adjusted to assume any desired rotative position between those shown in FIGS. 6 and 7, thus permitting substantially continuous adjustment of the amount of light which is permitted to pass through the baffle and reach the photoelectric element 12. The graduations 60 on the dial plate 46 are shown in terms of film speeds. The less sensitive the film (the lower its speed rating), the more is the knob 44 rotated in a counter-clockwise direction from its position shown in solid lines in FIG. 2, and hence the more do the strips 14 obstruct the face of the light sensitive element 12.

The effective space between the strips 14 is narrowed as the strips rotate from their positions shown in FIG. 6 toward their positions shown in FIG. 7. The narrowing of this space has an effect comparable to that of physical baffling, so that the vertical light acceptance angle of the exposure meter is not appreciably adversely affected despite the fact that the effective depth of the strips 14 in a direction at right angles to the light sensitive face of the photoelectric element 12 decreases. There is no appreciable change in the physical baffling effect produced by the disk-like projections 62, since they cooperate with one another in substantially the same manner no matter what the rotative position of the strips 14. Hence, although the rotative position of the strips 14 will vary in order to control the amount of light which is permitted to pass through the baffle and reach the photoelectric element 12 and although the strips 14 are oriented in a manner fully comparable to conventional baffle strips only when they are in their completely open position shown in FIG. 6, the overall effect of the baffle in modifying and controlling the angle of acceptance of external light is not appreciably modified as the position of the strips 14 is changed to vary the amount of entering light.

As a result, by means of a simple and inexpensive construction which need not be manufactured to any particularly critical degree of precision, the sensitivity of an exposure meter or the like may be varied mechanically by varying the amount of light permitted to reach the light sensitive element thereof. The same structure which serves as a baffle, restricting the angles from which a light may enter the apparatus, also serves to control the amount of light passing therethrough. The construction is such that at all times the area of the light sensitive surface of the photoelectric element which is illuminated is maximized, thus permitting the use of a smaller light sensitive element than would otherwise be needed and minimizing the possibility of inaccuracy because of non-uniformities in the light sensitive characteristics at different points on the light sensitive area. Mechanical baffling obtains in a direction parallel to the length of the strips in a substantially uniform manner no matter what the rotative position of those strips, and mechanical baffling in a direction at right angles thereto is substantially uniform, being accomplished in part by the physical presence and orientation of the strips and in part by variations in the light-admitting spaces between the strips.

While but a single embodiment of the present invention has been here disclosed, it will be apparent that many variations may be made therein, all within the scope of the instant invention as defined in the following claims.

I claim:

1. An adjustable baffle comprising an open-faced frame, a plurality of strips rotatably mounted in said frame one above the other and extending across the face thereof, said strips having a greater height than thickness and their axes of rotation being spaced from one another by distances slightly greater than their heights, meshing gears on said strips, whereby all strips will rotate together, at least one of said gears being hollow, the end of the strip connected thereto being exposed within said hollow, and control means engaged with the thus-exposed strip end to rotate said strip and, through said gears, to rotate the other strips as well.

2. The baffle of claim 1, in which said strips are provided along their lengths with a plurality of projecting disk-like parts which register with corresponding parts of the other strips, said disk-like parts having diameters at least substantially as great as the heights of said strips, said disk-like parts providing lateral baffling for all rotative positions of said strips.

3. An adjustable baffle comprising a frame, horizontal baffle elements extending thereacross, vertical baffle elements extending thereacross, said horizontal baffle elements having an appreciable depth and being articulately mounted on said frame for movement between their normal position in which their depth is substantially horizontally disposed and a second position in which their depth is substantially vertically disposed, said vertical baffle elements being carried by said horizontal baffle elements and being baffle-operative for all positions of said horizontal baffle elements, and control means operatively connected to said horizontal baffle elements for positioning the latter.

4. The baffle of claim 3, in which, when said horizontal baffle elements are in their second position, the adjacent upper and lower edges of said horizontal baffle elements are spaced from one another by a distance small in comparison with the depth of said elements.

5. In a photographic exposure meter comprising a housing, and a photoelectric element in said housing, said housing having an opening from the exterior thereof to said element for permitting external light to impinge upon said element; the improvement which comprises an open-faced frame mounted in said opening between said element and the exterior of said housing, a plurality of strips rotatably mounted in said frame one above the other and extending across the face thereof, said strips having a greater height than thickness and their axes of rotation being spaced from one another by distances slightly greater than their heights, meshing gears on said strips whereby all strips will rotate together, a control member on the exterior of said housing, and an operative connection between said control member and said strips for rotating the latter in response to movement of the former.

6. The exposure meter of claim 5, in which said strips are provided along their lengths with a plurality of projecting disk-like parts which register with corresponding parts of the other strips, said disk-like parts having diameters at least substantially as great as the heights of said strips, said disk-like parts providing lateral baffling for all rotative positions of said strips.

7. In a photographic exposure meter comprising a housing, and a photoelectric element in said housing, said housing having an opening from the exterior thereof to said element for permitting external light to impinge upon said element; the improvement which comprises an open-faced frame mounted in said opening between said element and the exterior of said housing, a plurality of strips articulately mounted in said frame so as to extend thereacross, said strips having greater height than thickness and being movable between operative positions in which their heights and thicknesses are respectively parallel to said element, a control member on the exterior of said housing, and an operative connection between said control member and said strips for rotating the latter in response to movement of the former.

8. The exposure meter of claim 7, in which said strips are provided along their lengths with a plurality of projecting disk-like parts which register with corresponding parts of the other strips, said disk-like parts having diameters at least substantially as great as the heights of said strips, said disk-like parts providing lateral baffling for all rotative positions of said strips.

9. In combination, a support, a photoelectric element mounted on said support, and, in front of said element, an adjustable baffle comprising a plurality of articulately mounted strips arranged across the face of said element, said strips having greater height than thickness and being movable between operative positions in which their heights and thicknesses are respectively parallel to the face of said element, and control means operatively connected to said strips to position them as desired, said strips being provided along their lengths with a plurality of projecting disk-like parts which register with corresponding parts of the other strips, thereby to provide lateral baffling for all rotative positions of said strips.

10. In combination, a support, a photoelectric element mounted on said support, and, in front of said element, an adjustable baffle comprising a plurality of articulately mounted strips arranged across the face of said element, said strips having greater height than thickness and being movable between operative positions in which their heights and thicknesses are respectively parallel to the face of said element, and control means operatively connected to said strips to position them as desired, said strips being provided along their lengths with a plurality of projecting disk-like parts which register with corresponding parts of the other strips, said strips being rotatable and their axes of rotation being spaced from one another by distances only slightly greater than the diameter of said disk-like parts, said disk-like parts providing lateral baffling for all rotative positions of said strips.

11. In combination, a support, a photoelectric element mounted on said support, and, in front of said element, an adjustable baffle comprising a plurality of articulately mounted strips arranged across the face of said element, said strips having greater height than thickness and being movable between operative positions in which their heights and thicknesses are respectively parallel to the face of said element, and control means operatively connected to said strips to position them as desired, said strips being substantially in the same plane when their heights are parallel to the face of said element and the longitudinal edges fo said strips are then spaced from one another by distances small in comparison with the heights of said strips, said strips being provided along their lengths with a plurality of projecting disk-like parts which register with corresponding parts of the other strips, thereby to provide lateral baffling for all rotative positions of said strips.

12. In combination, a support, a photoelectric element mounted on said support, and, in front of said element, an adjustable baffle comprising a plurality of articulately mounted strips arranged across the face of said element, said strips having greater height than thickness and being movable between operative positions in which their heights and thicknesses are respectively parallel to the face of said element, and control means operatively connected to said strips to position them as desired, said strips being substantially in the same plane when their heights are parallel to the face of said element and the longitudinal edges of said strips are then spaced from one another by distances small in comparison with the heights of said strips, said strips being provided along their lengths with a plurality of projecting disk-like parts which register with corresponding parts of the other strips, said strips being rotatable and the diameter of said disk-like parts being only slightly smaller than the spacing between the axes of rotation of said strips, said disk-like parts providing lateral baffling for all rotative positions of said strips.

13. In combination, a support, a photoelectric element mounted on said support, and, in front of said element, an adjustable baffle comprising a plurality of articulately mounted strips arranged one above the other across the height of said element, said strips having greater height than thickness and being movable between operative positions in which their heights and thicknesses are respectively parallel to the face of said element, the combined thicknesses of said strips constituting but a minor proportion of the height of said element, means interconnecting said strips for substantially simultaneous movement from a given operative position to the other operative position, and control means operatively connected to said strips to position them as desired, said strips being provided along their lengths with a plurality of projecting disk-like parts which register with corresponding parts of the other strips, thereby to provide lateral baffling for all rotative positions of said strips.

14. In combination, a support, a photoelectric element mounted on said support, and, in front of said element, an adjustable baffle comprising a plurality of articulately mounted strips arranged one above the other across the height of said element, said strips having greater height than thickness and being movable between operative positions in which their heights and thicknesses are respectively parallel to the face of said element, the combined thicknesses of said strips constituting but a minor proportion of the height of said element, means interconnecting said strips for substantially simultaneous movement from a given operative position to the other operative position, and control means operatively connected to said strips to position them as desired, said strips being provided along their lengths with a plurality of projecting disk-like parts which register with corresponding parts of the other strips, said strips being rotatable and their axes of rotation being spaced from one another by distances only slightly greater than the diameter of said disk-like parts, said disk-like parts providing lateral baffling for all rotative positions of said strips.

15. In combination, a support, a photoelectric element mounted on said support, and, in front of said element, an adjustable baffle comprising a plurality of articulately mounted strips arranged one above the other across the height of said element, said strips having greater height than thickness and being movable between operative positions in which their heights and thicknesses are respectively parallel to the face of said element, the combined thicknesses of said strips constituting but a minor proportion of the height of said element, means interconnecting said strips for substantially simultaneous movement from a given operative position to the other operative position, and control means operatively connected to said strips to position them as desired, said strips being substantially in the same plane when their heights are parallel to the face of said element and the longitudinal edges of said strips are then spaced from one another by distances small in comparison with the heights of said strips, said strips being provided along their lengths with a plurality of projecting disk-like parts which register with corresponding parts of the other strips, thereby to provide later baffling for all rotative positions of said strips.

16. In combination, a support, a photoelectric element mounted on said support, and, in front of said element, an adjustable baffle comprising a plurality of articulately mounted strips arranged one above the other across the height of said element, said strips having greater height than thickness and being movable between operative positions in which their heights and thicknesses are respectively parallel to the face of said element, the combined thicknesses of said strips constituting but a minor proportion of the height of said element, means interconnecting said strips for substantially simultaneous movement from a given operative position to the other operative position, and control means operatively connected to said strips to position them as desired, said strips being substantially in the same plane when their heights are parallel to the face of said element and the longitudinal edges of said strips are then spaced from one another by distances small in comparison with the heights of said strips, said strips being provided along their lengths with a plurality of projecting disk-like parts which register with corresponding parts of the other strips, thereby to provide lateral baffling for all rotative positions of said strips.

17. An adjustable baffle comprising an open-faced frame, a plurality of strips rotatably mounted in said frame one above the other and extending across the face thereof, said strips having a greater height than thickness and their axes of rotation being spaced from one another by distances slightly greater than their heights, meshing gears on said strips, whereby all strips will rotate together, and control means operatively connected to at least one of said strips to rotate it and, through said gears, to rotate the other strips as well, said strips being provided along their lengths with a plurality of projecting disk-like parts which register with corresponding parts of the other strips, said disk-like parts having diameters at least substantially as great as the heights of said strips, said disk-like parts providing lateral baffling for all rotative positions of said strips.

(References on following page)

References Cited in the file of this patent

UNITED STATES PATENTS

| | | | |
|---|---|---|---|
| 1,384,658 | Benard | July 12, | 1921 |
| 1,789,230 | Heaton | Jan. 13, | 1931 |
| 1,830,487 | Samberg | Nov. 3, | 1931 |
| 2,182,987 | Hopkins | Dec. 12, | 1939 |
| 2,186,613 | Mihalyi | Jan. 9, | 1940 |
| 2,763,177 | Taylor | Sept. 18, | 1956 |
| 2,896,508 | Biedermann | July 28, | 1959 |
| 2,925,634 | Ewing | Feb. 23, | 1960 |
| 2,928,025 | McIlvaine | Mar. 8, | 1960 |